Nov. 18, 1924.
R. SÉGUIN
1,516,410
BUMPER FOR AUTOMOBILES
Filed Dec. 18, 1923
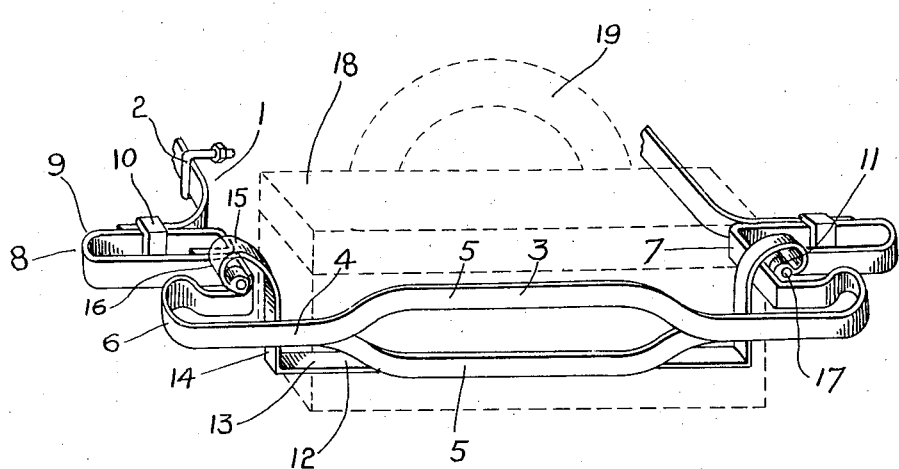
INVENTOR
RALPH SÉGUIN
BY Featherstonhaugh & Co
ATTORNEYS Patented Nov. 18, 1924.

1,516,410

UNITED STATES PATENT OFFICE.

RALPH SÉGUIN, OF VANCOUVER, BRITISH COLUMBIA, CANADA.

BUMPER FOR AUTOMOBILES.

Application filed December 18, 1923. Serial No. 681,412.

*To all whom it may concern:*

Be it known that I, RALPH SÉGUIN, a subject of the King of Great Britain, and a resident of the city of Vancouver, in the Province of British Columbia, Canada, have invented certain new and useful Improvements in Bumpers for Automobiles, of which the following is a specification.

My invention relates to improvements in bumpers for automobiles, the objects of the invention being to provide such resiliency to a bumper that shocks of collisions are so absorbed that no serious strain is imparted to the automobile to which the bumper is fitted. A further object is to provide a spacing within the bumper in which a trunk may be conveniently carried and to permit of a tire being conveniently removed from the tire carrier when desired.

The invention consists essentially of a bumper made of spring steel and which is provided with a plurality of offset spring loops at opposite ends and a transverse member carried between the loops on which a trunk is adapted to be carried, as will be more fully described in the following specification in which:—

The drawing is a general view of my invention.

The numeral 1 indicates a pair of curved brackets which are attached to the chassis of the automobile by suitable clips 2, the brackets forming a support for the bumper which is generally indicated by the numeral 3. The central bow 4 is preferably formed with a pair of transverse members 5 spaced apart as shown to present a broad protecting area to a colliding vehicle, the opposite extremities of the bow 4 being bent back upon themselves to form a spring loop 6 from the inner end of which they are turned at right angles to the bow 4 as at 7 for a distance approximately equal to the length of the loops 6, when the metal is again turned to form links 8 which project parallel to and beyond the loops 6, the rear side 9 of the loops 8 being secured by suitable clips 10 to the outer end of the brackets 1. Upon the upper edge of each of the right angular members 7 is provided a hinge member 11 the purpose of which will hereinafter appear.

The numeral 12 indicates generally a trunk carrier formed of similar material to the bumper 3, which consists of a transverse carrier 13 having a pair of upturned members 14 at opposite ends which are outwardly curved as at 15 and provided with hinge members 16 at their outer extremities which connect with the hinge members 11 of the bumper 3 and are held in place with suitable bolts 17.

The numeral 18 indicates a trunk (shown in dotted line) which is suitably secured to the transverse carrier 12.

I may prefer to use a spring clip or other means for releasably connecting one of the curved members 15 to the transverse carrier 12.

The numeral 19 indicates a tire (shown in dotted line) suitably mounted upon a carrier attached to the automobile.

Having thus described the several parts of my invention, I will now describe its particular utility.

The bumper being provided with a plurality of spring loops adds materially to the ability of the bumper to absorb collision shocks without transmitting them to the car to which it is fitted. In the event of a collision a great deflection can take place in the bumper without it being bent out of shape or the part of the vehicle causing the impact reaching the body of the car to which the bumper is fitted.

A trunk when fitted is resiliently suspended so that its contents are not badly disturbed when driving over rough roads.

The distance of the bow 4 of the bumper from the car is such that ample room is provided for the convenient removal and replacement of spare tires.

What I claim as my invention is:

1. A bumper for automobiles comprising a strip of metal having a transverse member bent back upon itself at opposite ends, members at right angle to the bent back portions each terminating in a closed substantially rectangular loop disposed in parallel relation to the transverse member.

2. In combination with a bumper for automobiles comprising a transverse member having a support adjacent each end, means releasably attached to and extending inwardly between the supports for carrying a trunk.

3. In combination with a bumper for automobiles comprising a transverse member having a support adjacent each end, a bar extending between the supports for carrying a trunk and spring suspension means for the bar.

Dated at Vancouver, B. C., this 22nd day of November. 1923.

RALPH SÉGUIN.

Witnesses:
J. J. JOHNSTON,
ERNEST E. CARVER.